W. H. WALTERS.
APPARATUS FOR TEACHING THE ART OF AEROPLANING, APPLICABLE ALSO FOR AMUSEMENT PURPOSES.
APPLICATION FILED JUNE 16, 1910.

1,018,645.

Patented Feb. 27, 1912.

5 SHEETS—SHEET 1.

WITNESSES
R. C. Braddock.
Emory T. Groff.

INVENTOR
WILLIAM HOWELL WALTERS
By
HIS ATTORNEY

W. H. WALTERS.
APPARATUS FOR TEACHING THE ART OF AEROPLANING, APPLICABLE ALSO FOR AMUSEMENT PURPOSES.
APPLICATION FILED JUNE 16, 1910.

1,018,645.

Patented Feb. 27, 1912.

5 SHEETS—SHEET 5.

WITNESSES
R. C. Braddock
Emory L. Groff

INVENTOR
WILLIAM HOWELL WALTERS
By
HIS ATTORNEY

UNITED STATES PATENT OFFICE.

WILLIAM HOWELL WALTERS, OF BROAD HAVEN, ENGLAND.

APPARATUS FOR TEACHING THE ART OF AEROPLANING, APPLICABLE ALSO FOR AMUSEMENT PURPOSES.

1,018,645.  Specification of Letters Patent.  Patented Feb. 27, 1912.

Application filed June 16, 1910. Serial No. 567,290

*To all whom it may concern:*

Be it known that I, WILLIAM HOWELL WALTERS, a subject of the King of Great Britain and Ireland, and resident of Broad Haven, county of Pembroke, Wales, England, have invented certain new and useful Apparatus for Teaching the Art of Aeroplaning, Applicable also for Amusement Purposes, of which the following is a specification.

The object of the present invention is to provide an apparatus which will enable the would-be aviator to accustom himself to the varying angles of the planes and the means with which the equilibrium of the apparatus (in practice, the actual machine) can be maintained or restored without having recourse to the actual machine and damage thereto when practicing.

An apparatus as hereinafter set forth, and when used in conjunction with endless traveling bands painted in any suitable manner, and a fan for blowing a current of air against the user, is well adapted for amusement purposes.

The apparatus consists essentially of a base or platform provided with a stand or frame in which is mounted, so as to have movement in all directions, a pillar or seat member to which is attached the frame of the aeroplane. Movement is imparted to this pillar either by the instructor or by mechanical means so as to upset the balance or equilibrium of the plane, the would-be aviator or pupil, seated in the apparatus, endeavoring through a suitable arrangement of levers, cords or the like, connected to means engaging the pillar, to restore the balance, the instructor pointing out meanwhile his (the pupil's) mistakes, means electrical being provided to give an audible signal when the plane reaches the danger angle.

This apparatus is readily adaptable for any style of existing aeroplane, inasmuch as it is only necessary to re-arrange the means operable by the pupil working the apparatus to suit the style of aeroplane which he (the pupil) will afterward use.

The invention is illustrated in the accompanying drawings as applied to a biplane.

Figure 1:
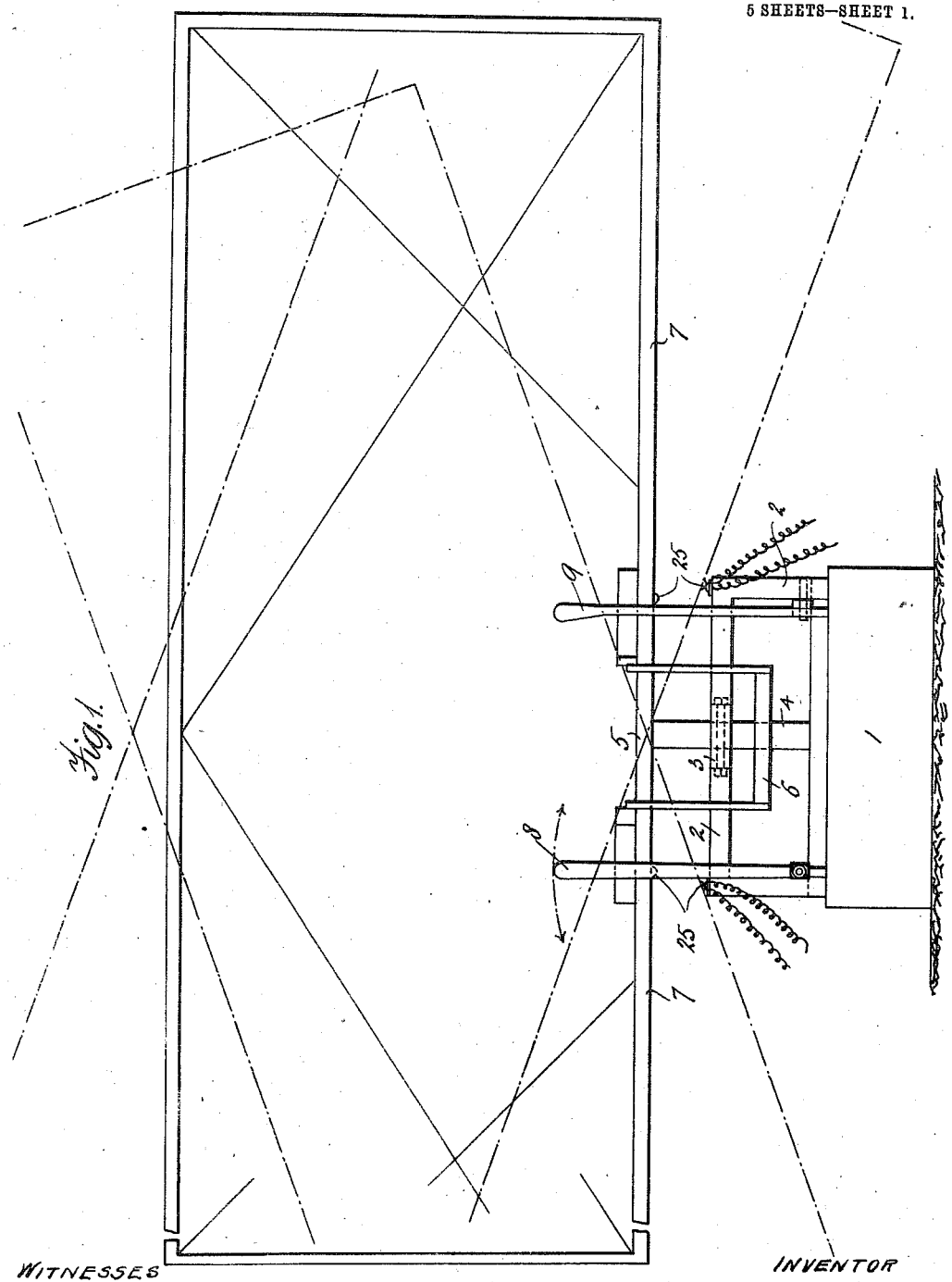
Figure 2:
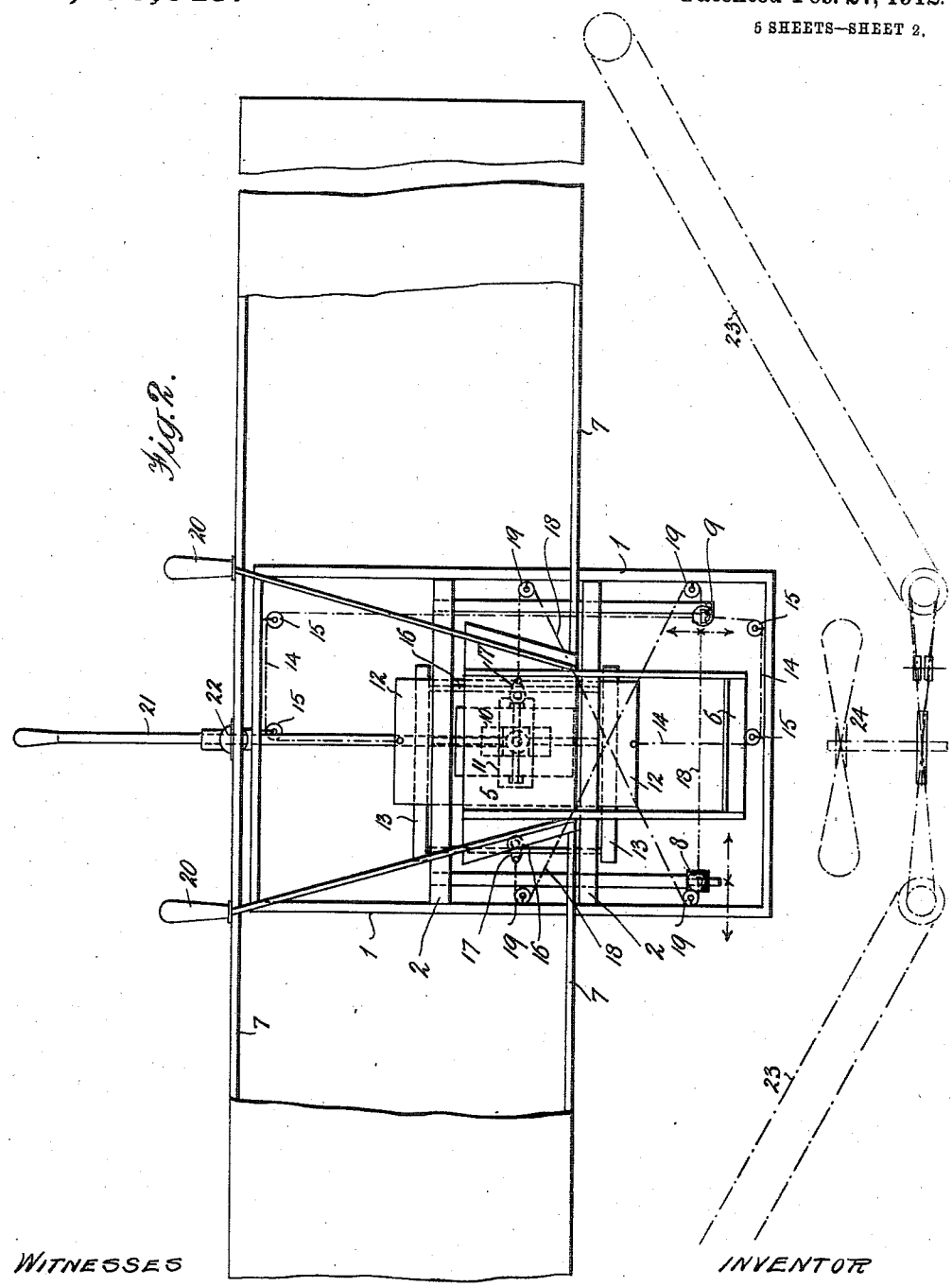
Figure 3:
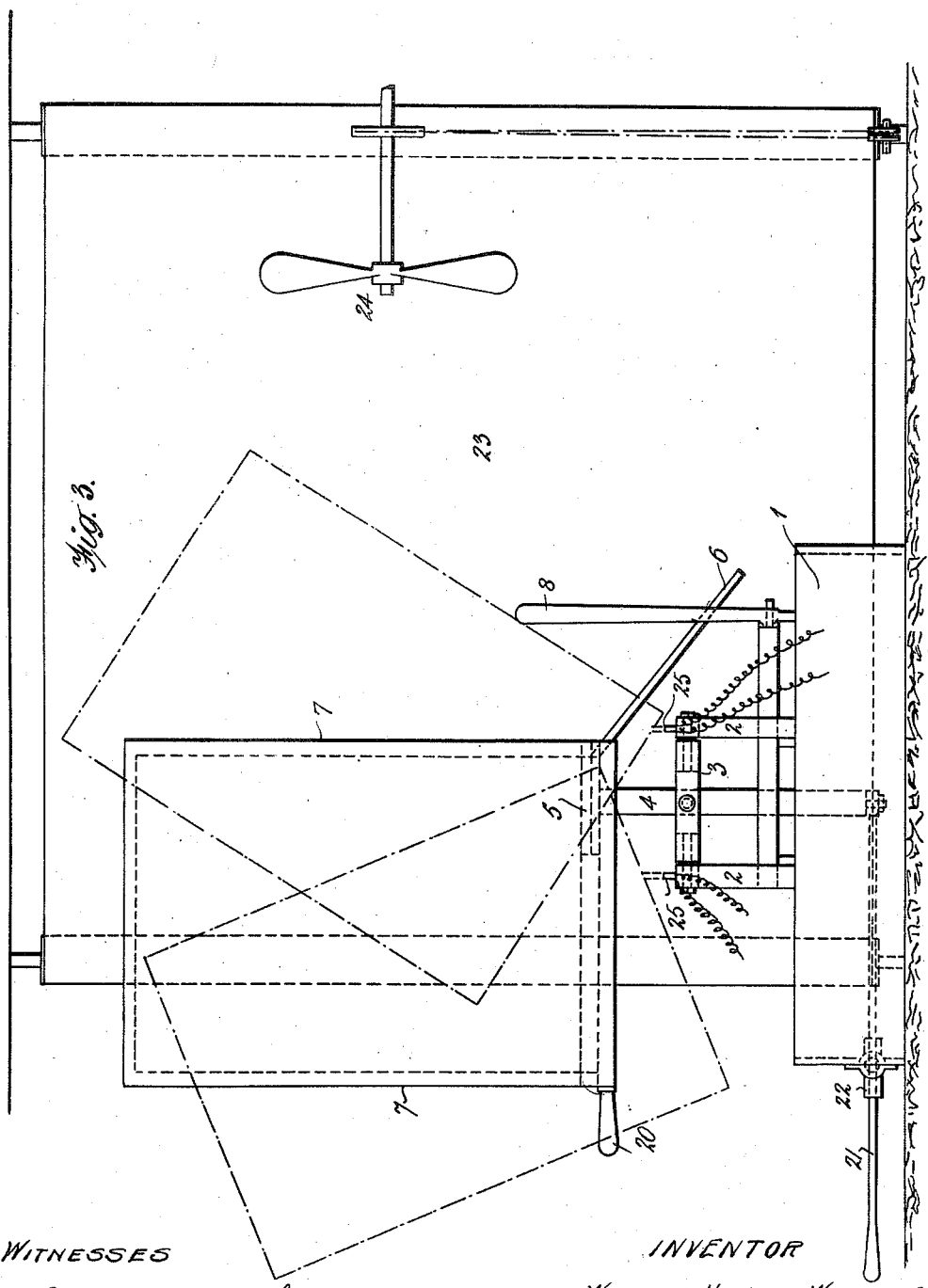
Figure 4:
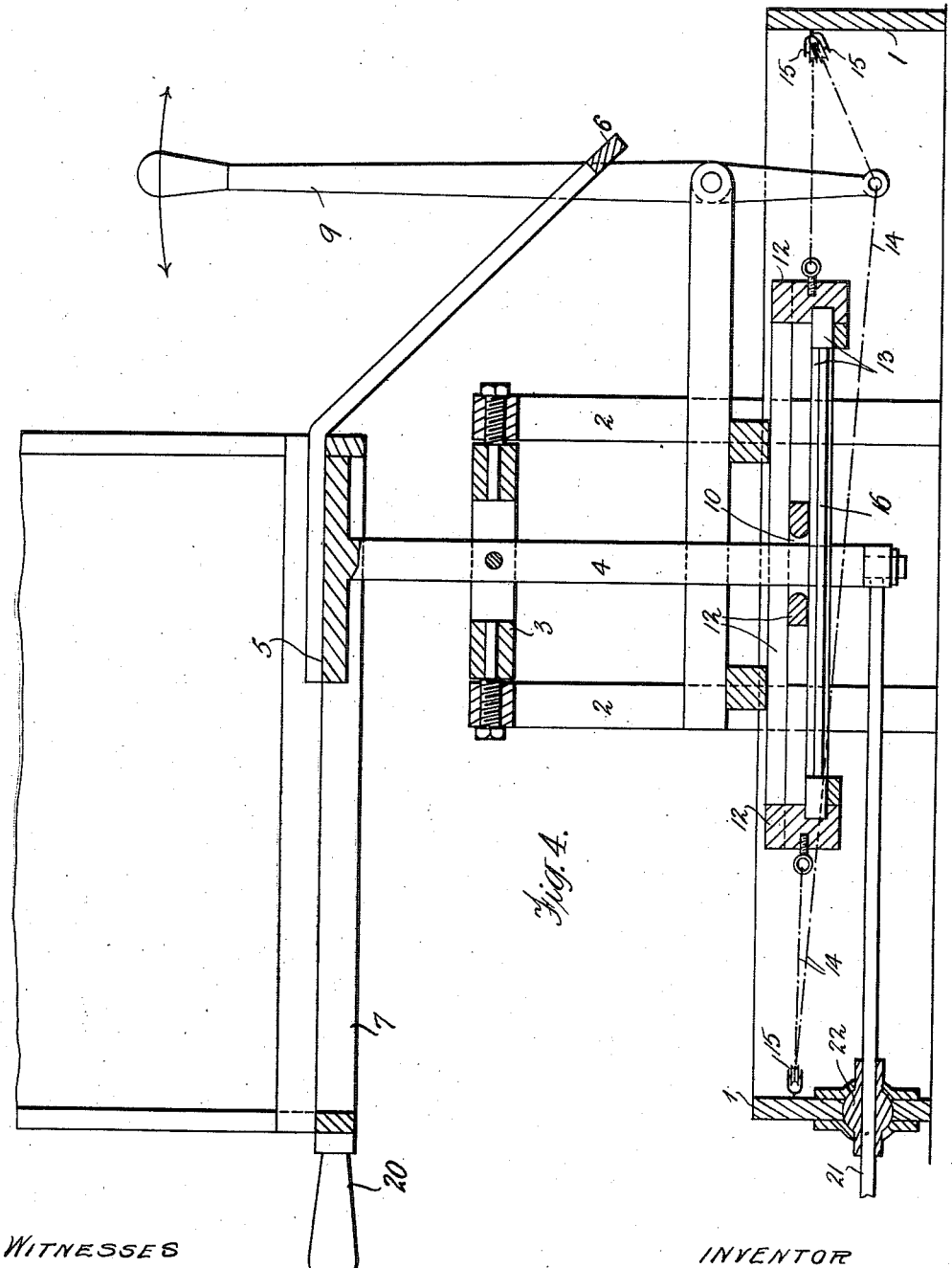
Figure 5:
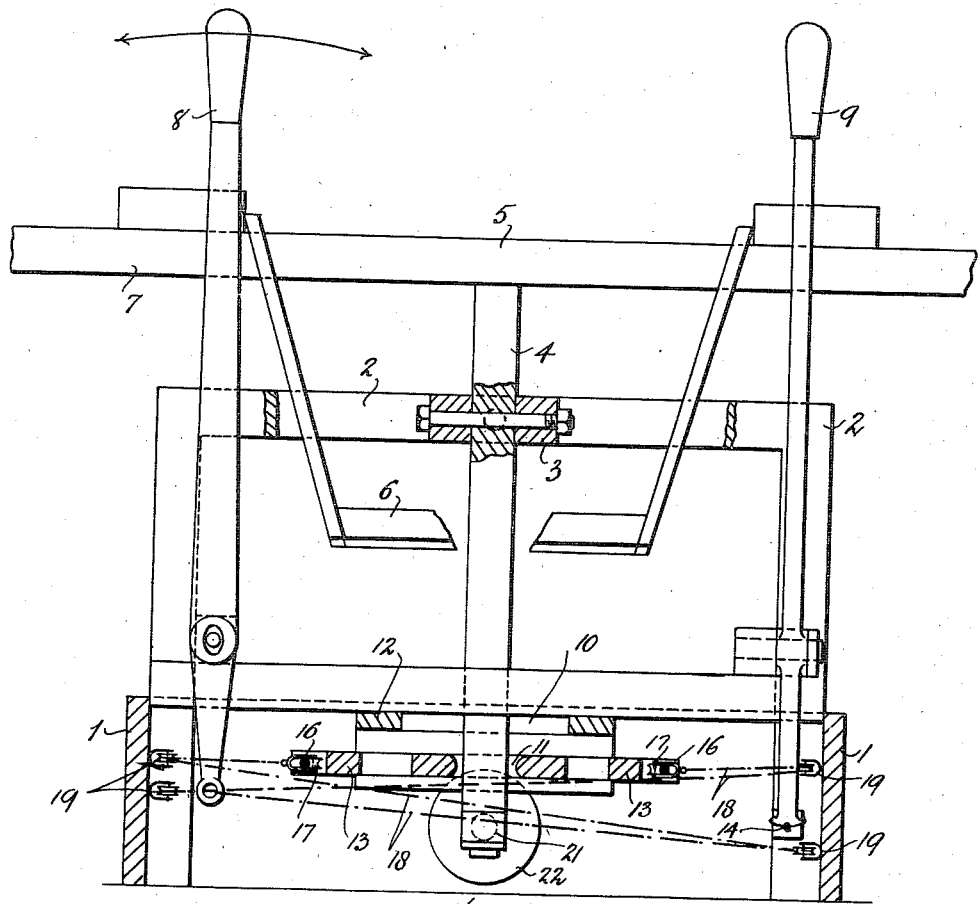

Figures 1 to 3 are diagrammatic views, Fig. 1 being a front elevation, Fig. 2 a plan view and Fig. 3 a side elevation. Figs. 4 and 5 are views at right angles to one another to an enlarged scale and partly in section to illustrate certain details of the apparatus.

Like letters of reference indicate corresponding parts in the several views.

In said drawings—Figs. 1 to 3—1 is the base or platform, and 2, 2 the members constituting the stand in which is pivotally mounted the member 3. In said member 3 is pivotally mounted the saddle member or pillar 4 provided at its upper end with the seat 5, foot rest 6, and 7 is the frame of the plane attached to seat 5, while 8 and 9 are hand levers pivoted to the stand, the use of said hand levers being hereinafter explained.

The lower end of pillar 4 loosely fits in slots 10 and 11 formed respectively in slides 12 and 13—Figs. 2, 4 and 5—mounted transversely to one another, the lower (the slide 13) working in the slide 12. The front and rear ends of the slide 12 are connected by a wire, rope or the like 14 passing around pulleys 15 loosely attached to the base or platform 1, to the lower end of the hand lever 9, while the slide 13 is provided with bars 16 on which run pulleys 17 which are connected by wire, cord or the like 18 passing around pulleys 19 and attached to the lower end of the hand lever 8, the wire, cord or the like 18 crossing on itself in the manner shown in Fig. 2.

In practice the pupil occupies the seat 5, his feet being on the rest 6, so that he is clear of the platform or base, and grasps the hand levers 8 and 9. The instructor now takes up his position behind the frame 7 and causes the frame to be rocked as shown in dot and dash lines Figs. 1 and 3, either by grasping the handles 20 and tilting the frame and with it the pillar 4 on its pivotal bearings, or by pushing or pulling the rod 21 connected to the lower end of the pillar 4 in or out or by swinging the same in its bearing 22 to one side or the other, the pupil meanwhile endeavoring by suitably manipulating the hand levers 8 and 9 to recover his balance. To this end when falling toward the right he leans to the left, pulling the hand lever 8 to the left and through the medium of the cord or wire 18 pulls the slide 13 over and with it the pillar 4 to its normal, but when falling to the left he leans to the right, pulling hand lever 8 to the right and with it the slide 13 over in the opposite direction bringing the pillar to its normal. When falling downward at the front he leans backward, pushing the hand lever 9 forward, pulling slide 12 backward, bringing pillar 4 to the vertical, and when falling downward at the back he leans forward, at the same time pulling the hand lever 9 backward, drawing slide 12 forward, thus restoring the pillar to the vertical.

If the apparatus is to be rocked mechanically, then suitable arrangement of springs must be employed so as to give when the pupil endeavors to right his balance, it of course being understood that the instructor yields to the endeavor of his pupil.

Many arrangements for effecting the movement of the slides 12 and 13 may be employed, for instance, the hand levers 8 and 9 may be dispensed with and a steering wheel having a rotary and a push-and-pull movement substituted therefor, said steering wheel and its shaft being connected to the wires or cords 14 and 18 in any suitable manner, or the wires or cords may be operated by pedals, leaving the hands free so long as the slides are operated to bring the saddle pillar into its vertical position. The stand may be raised well off the ground and all working parts, with the exception of the hand levers 8 and 9 and rod 21, may be entirely boxed in. Further, the action of the hand levers 8 and 9 may be reversed, i. e. when falling forward pull backward and when falling backward pull forward, or when falling to the right lean to the left pushing hand lever 8 to the right, or when falling to the left lean to the right pulling hand lever 8 to the left. In all cases the hand lever 8 is so pivotally mounted on the stand as to be capable of a slight movement in any direction so as to accommodate itself to the hand of the pupil, and when the apparatus is in its normal position both hand levers are in the vertical position.

Although the seat pillar is shown and described as pivotally mounted in another member which is pivotally mounted in the stand, yet said pillar may be carried by any usual kind of universal or ball and socket joint without departing from the invention.

When the apparatus is to be employed for the purpose of amusement, then the apparatus is partly inclosed by endless traveling bands 23—Figs. 2 and 3—converging toward one another in the front of the apparatus and means such as a fan 24 located near the junction of the bands is employed to drive a current of air against the user (aviator) of the apparatus, both bands and fan being driven at a high speed and in any suitable manner so, as to convey to the user (aviator) the impression of traveling through the air. To give an audible signal when the plane reaches the danger angle, suitable contacts 25—Figs. 1 and 3—are arranged on the stand 2, the same engaging with the frame or suitable studs thereon to set in motion an electric bell or bells.

Having now described my invention, what I claim as new and desire to secure by Letters Patent of the United States is:—

1. An apparatus for teaching the art of aeroplaning, comprising a stationary support, a seat universally connected thereto, means for rocking said seat to destroy the equilibrium thereof, and means operable from said seat to restore the equilibrium thereof.

2. An apparatus for teaching the art of aeroplaning characterized by a base, a stand thereon, a seat pillar universally mounted in said stand, means operable by the instructor to rock said pillar and with it the plane to upset the equilibrium of the pupil and means operable by the pupil to restore the equilibrium of the plane substantially as described.

3. An apparatus for teaching the art of aeroplaning comprising in combination, a base or platform, a stand thereon, a seat pillar universally mounted in said stand, means for rocking said pillar to destroy the equilibrium of the plane, said means consisting of hand levers carried by the plane frame and connected to the lower end of the seat pillar and operable by the instructor, slides transversely arranged to one another and working within the stand and base or platform and engaging the seat pillar, and means connected to said slides and to levers or equivalent devices carried by the stand or base and operable by the pupil to effect the restoration of the equilibrium of the plane by the movement of the slides substantially as herein described.

4. An apparatus for teaching the art of aeroplaning comprising a pupil's seat, means for causing through said seat the sensations of flight and unstable equilibrium, means for simultaneously producing artificial air currents against and past the pupil, and creating the illusion of passing scenery and means for restoring the apparatus to normal condition.

5. An apparatus for teaching the art of aeroplaning comprising a pupil's seat, means for causing through said seat the sensations of flight and unstable equilibrium, endless traveling bands arranged in front of the seat to imitate passing scenery and means for restoring the apparatus to normal condition.

6. An apparatus for teaching the art of aeroplaning comprising a pupil's seat, means for causing through said seat the sensations of flight and unstable equilibrium, divergently arranged traveling bands located in front of the seat to imitate passing scenery, a fan located between said bands in front of said seat and means for restoring the apparatus to normal condition.

7. An apparatus for teaching the art of aeroplaning comprising a stationary base support, a stand rigid therewith, a seat pillar universally connected to said stand, a seat carried thereby, means operable from the ground for destroying the equilibrium of said seat, and means operable from said seat for restoring the equilibrium thereof.

8. An apparatus for teaching the art of aeroplaning comprising a stationary base support, a seat universally connected thereto, means operable from the ground for destroying the equilibrium of said seat, means operable from said seat to restore the equilibrium thereof, means arranged in front of the seat and support to imitate scenery that is being passed, and means for discharging continuous air currents in front of said seat.

In testimony whereof I have affixed my signature in presence of two witnesses.

WILLIAM HOWELL WALTERS.

Witnesses:
 ROBT. HUNTER,
 EDWIN C. AXE.